April 16, 1929.　　A. E. JERRAM　　1,709,791
POWER DRIVEN LAWN MOWER
Filed March 23, 1927　　5 Sheets-Sheet 1

April 16, 1929.  A. E. JERRAM  1,709,791
POWER DRIVEN LAWN MOWER
Filed March 23, 1927  5 Sheets-Sheet 5

Inventor
A. E. Jerram
by Wilkinson & Giusta
Attorneys.

Patented Apr. 16, 1929.

1,709,791

UNITED STATES PATENT OFFICE.

ARTHUR ERNEST JERRAM, OF OADBY, ENGLAND

POWER-DRIVEN LAWN MOWER.

Application filed March 23, 1927, Serial No. 177,791, and in Great Britain April 1, 1926.

This invention relates to power-driven lawn mowers of the type comprising a rotary cutter. Such machines comprise a large number of mechanisms of different kinds, including the power-unit, a rotary cutter, a driving roller, and driving gear between the power-unit, the cutter and the roller. As such machines are frequently worked under very severe and varying conditions exposed to the weather and dirt and are used by persons, such as gardeners, who are not skilled mechanics it is very important that each of these mechanisms shall be well designed and skillfully arranged in conjunction with the rest in order to contribute to the satisfactory working of the machine as a whole with a minimum of attention.

In a machine of the type described it has heretofore been proposed to provide a change-speed gear, but this was arranged to alter the speed of travel of the machine as a whole according to the power required to drive it under varying conditions, and not to vary the speed of rotation of the rotary cutter and driving roller in relation one to the other.

This invention has for its main object the provision of an improved construction of a power-driven lawn mower of the rotary cutter type better fitted than constructions proposed heretofore to satisfy the varying working conditions met with and to enable the moving elements to co-operate one with another in the most direct and efficient manner.

Another object is the provision of driving gear of improved construction between the power-unit and the rotary cutter and back roller. A further object is to protect the rotary cutter and also the power-unit in an improved manner from injury owing to the rotary cutter and ledger blade being forced too hard into contact by adjustment or owing to an obstacle, such as twigs, a stone or the ground or too thick grass getting trapped between the two. A still further object is to enable the rate at which the back roller is driven to be varied at will in relation to the rate at which the rotary cutter is driven, in order to enable a power-unit that is just powerful enough for ordinary use to remove a specially heavy crop of grass, or to climb gradients, or to obtain a specially smooth finish of a close-cut lawn.

According to an important feature of the invention, there is provided a power-driven lawn-mower comprising the combination of a frame, a rotary cutter and a driving roller journalled therein, a power-unit carried by said frame, transmission means operatively connecting the power-unit with said cutter and said roller, which transmission means comprises an engine-driven driving shaft and a change-speed gear driven by the latter, which change-speed gear is of the step-by-step type having a plurality of pairs of gear wheels of different gear ratios, and a controlling device for the change-speed gear for selecting at will any of the said gear ratios and thereby varying the speed of said cutter and roller in relation one to the other and the speed of one of them in relation to that of the power-unit, for the purposes of enabling a motor that is just powerful enough for normal use when driving the roller at one speed to be capable of being used for heavier work, such as cutting a heavy crop of grass or climbing up a gradient when driven at a lower speed, and enabling the mower to impart a very smooth finish to a close-cut lawn. With machines of the rotary cutter type in which a series of cutter blades shear intermittently during the progress of the machine over the lawn, a certain amount of ribbing takes place, particularly in certain conditions of the grass, that is to say with a smooth shaven lawn a series of what appear like fine sand ripples can be observed. In the improved construction the intermittently acting cutters can be speeded up so that this ripple is made much finer, whilst the machine is still available for cutting at what is, in practice, the best timed intermittent action for general purposes.

According to another feature of the invention, said power-transmission means comprises a manually controllable clutch arranged to disengage the driving connection between the motor and roller. This clutch is preferably provided between the said change-speed gear and the back roller.

According to a further feature of the invention, the frame of the mower comprises a rigid side member formed as or providing a casing in the form of a gear-box wherein said change-speed gear and also a driving connection between a power-unit-driven shaft and the cutter are housed. This casing is preferably charged with oil so that the mechanism therein runs constantly in oil.

According to yet another feature of the invention, the power-unit is mounted spaced away from the gear-box on cross members of the frame secured to said side member, and a main driving shaft extending into the gear-box is connected to the power-unit crank-shaft by a self-adjustable coupling (e. g. a self-aligning flexible coupling) for preventing the transmission mechanism from being subjected to stresses due to flexure of the frame members carrying the power-unit.

According to still another feature of the invention, a lawn mower having the features set forth above is provided with a slip clutch between the power-unit and the rotary cutter, and is characterized in that the said clutch comprises clutch discs whereof the opposed engaging faces are ribbed or otherwise so formed as to give a warning sound when the clutch is slipping. Further, when such a clutch is combined with devices to hold it disengaged the mower can be temporarily used as a power-driven roller only.

Other features of the invention will be described hereinafter and pointed out in the claims.

One embodiment of the invention is diagrammatically illustrated by way of example in the accompanying drawings. In said drawings—

Some of the figures are drawn on a scale different from that of the others, but like reference numerals designate like parts throughout the several views.

Figure 10:
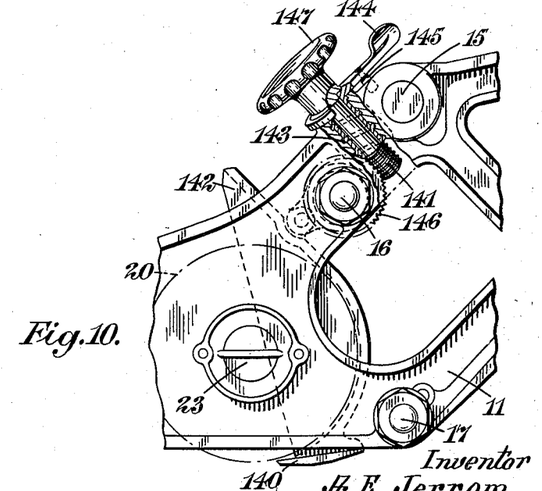
Figure 10 is a side elevation, partly in section, showing part of one side member of the frame and the mechanism for adjusting the carrier of the ledger blade.

Referring to the drawings, the power-driven lawn-mower (Figure 1) has a frame designated generally by the numeral 10, comprising two side members 11, 12, connected together by three main cross members 13, 14, 15 in the form of stretcher rods arranged one, 13 at the front, a second, 14, at the rear, and a third, 15, near the middle of the side members 11, 12; the second and third stretcher rods 14, 15 are substantially in the same general longitudinal plane at the top of the side members 11, 12. Two other cross members 16, 17 (Figure 10) in the form of distance rods, one above the other, extend between the side members below the middle stretcher rod 15.

A rotary cylindric cutter 20 has its shaft 21 journalled in ball bearings at 22 and 23 in the side members between the front stretcher rod 13 and the distance rods 16, 17, so as to be readily detachable in any convenient manner, but preferably as described in the prior Patent No. 1,486,758. A driving or back roller designated generally by the reference numeral 24 is journalled by ball bearings 25, 26 in the side members between the distance rods 16, 17 and the rear stretcher rod 14, and a front roller made in sections, designated generally by the numeral 27, is journalled in the side members between the cutter 20 and the front stretcher rod 13.

A power-unit designated generally by the numeral 30, in the form of an air- and water-cooled internal-combustion engine, for driving the cutter 20 and back roller 24 is detachably supported at three points on the back and middle stretcher rods 14, 15 by readily detachable fastening devices, in such a manner that it can be readily removed in case of need. For this purpose the crank-case is formed or provided with two arms 31, 32 respectively extending fore and aft of the machine. The rear arm 32 terminates in a sleeve 33, 34 that is split longitudinally and embraces the back stretcher rod 14; the part 33 is longer than the part 34 and makes contact with the rod 14 only at the ends of the sleeve; the one part 34 of the sleeve constitutes a movable jaw which is pivoted to the other part 33 constituting a fixed jaw of a clip designated generally by the numeral 35 which can be closed on the stretcher rod by a single bolt 36 that is pivoted on the fixed jaw 33 and extends through a hole on the movable jaw 34. The front arm 31 of the crank-case is detachably secured to the middle stretcher rod 15 by a like clip 37 except that its sleeve 38 having a bolt 39 is much shorter than the part 33 of the clip 35 and contacts with its stretcher rod 15 along the entire length of the clip. The motor is thus provided with a three-point support on the frame, so that even if the stretcher rods 14, 15 carrying it flex laterally the motor will not be subjected to any material bending stresses and the alignment of its bearings will not be affected. Further, to release the motor from the frame it is necessary to loosen only two bolts 36 and 39. If desired the clip 35 affording two points of support may engage the rod 15 and the clip 37 may engage the rod 14, but the arrangement illustrated is that preferred.

Figures 1, 4, 6, 7:
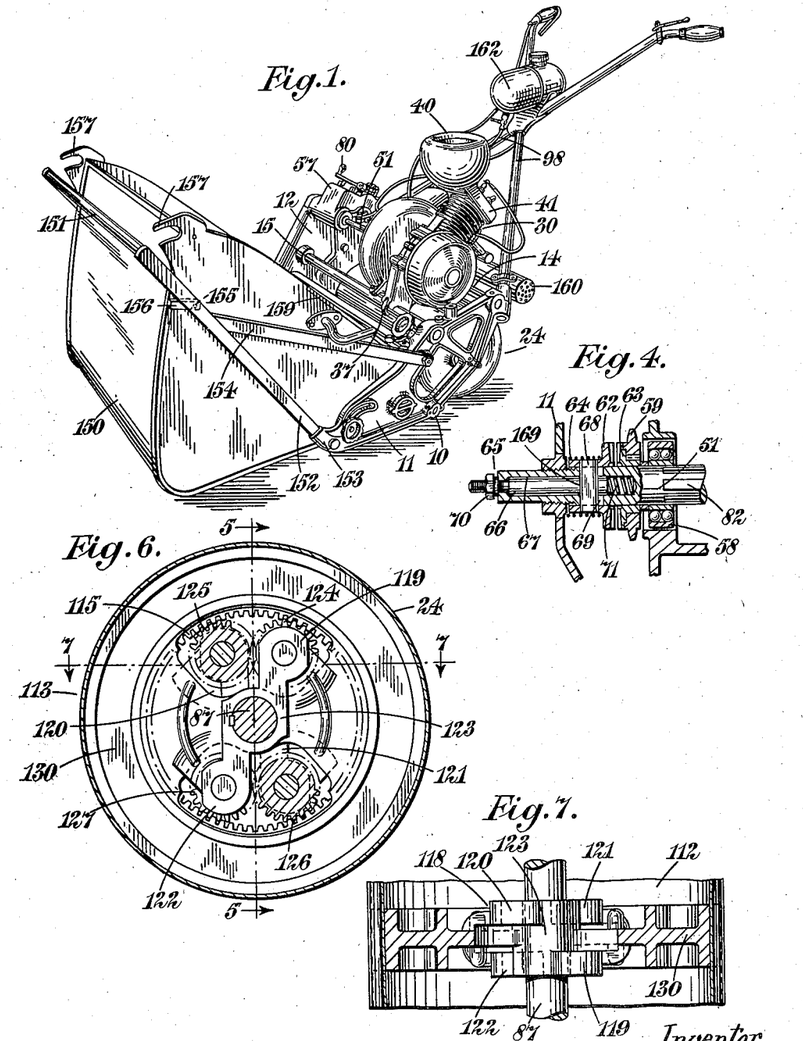
Figure 1 is a perspective view of a complete power-driven lawn-mower according to the invention.
Figure 4 is an enlarged detail sectional view of the slip clutch shown in Figure 2.
Figure 6 is a vertical section taken on the line 6—6 in Figure 5.
Figure 7 is a horizontal sectional view taken on the line 7—7 in Figure 6.
Figure 2:
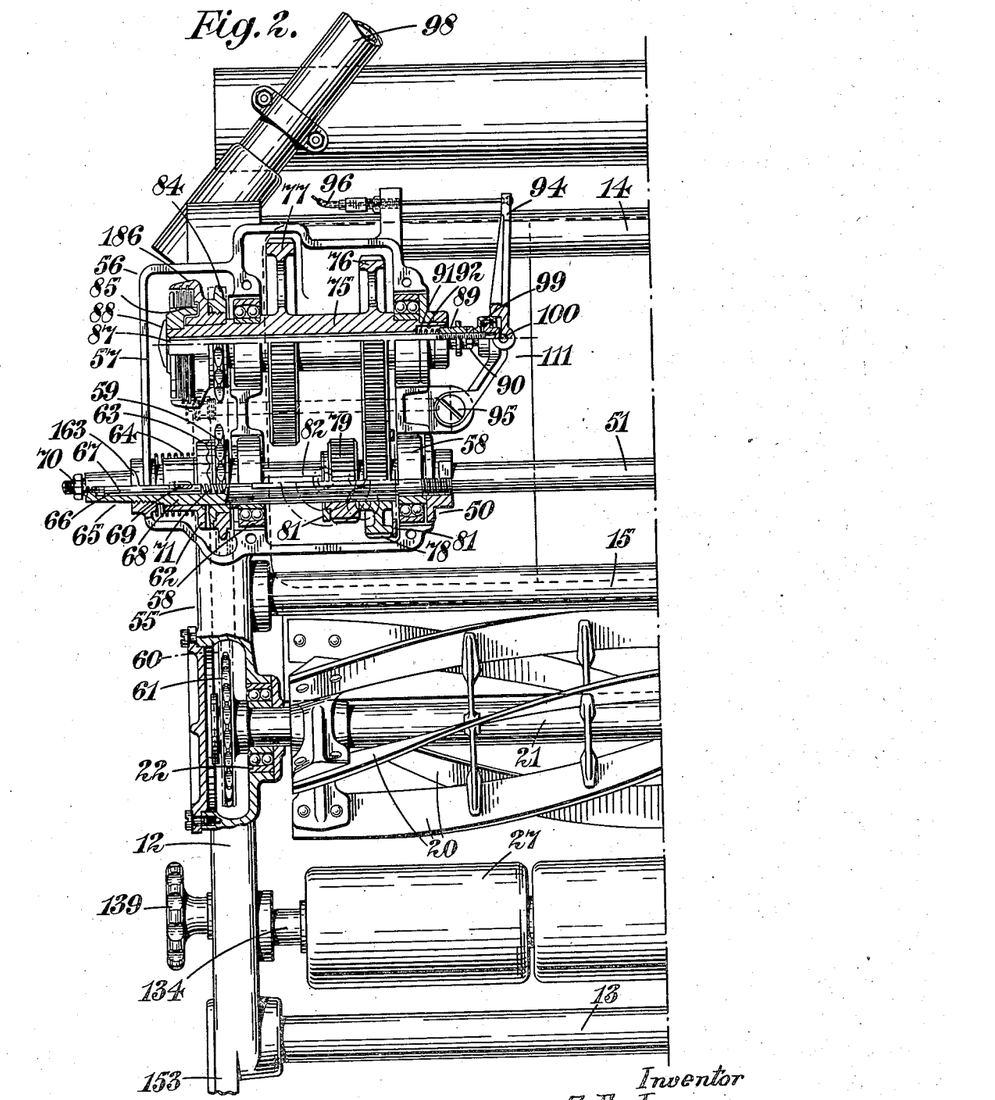
Figures 2 and 2ª are a plan thereof, with some parts removed and others broken away and partly in section, to show the slip clutch and change-speed gear aforesaid and other features.
Figure 2A:
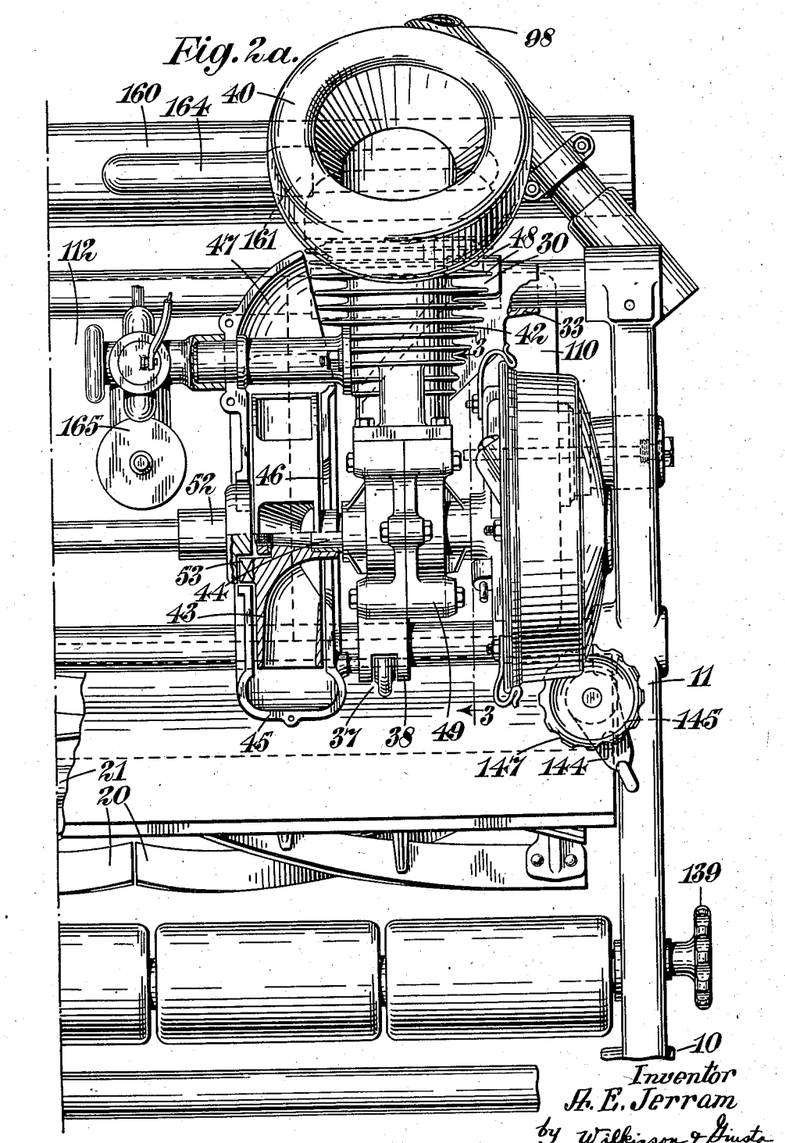
Figures 3, 5:
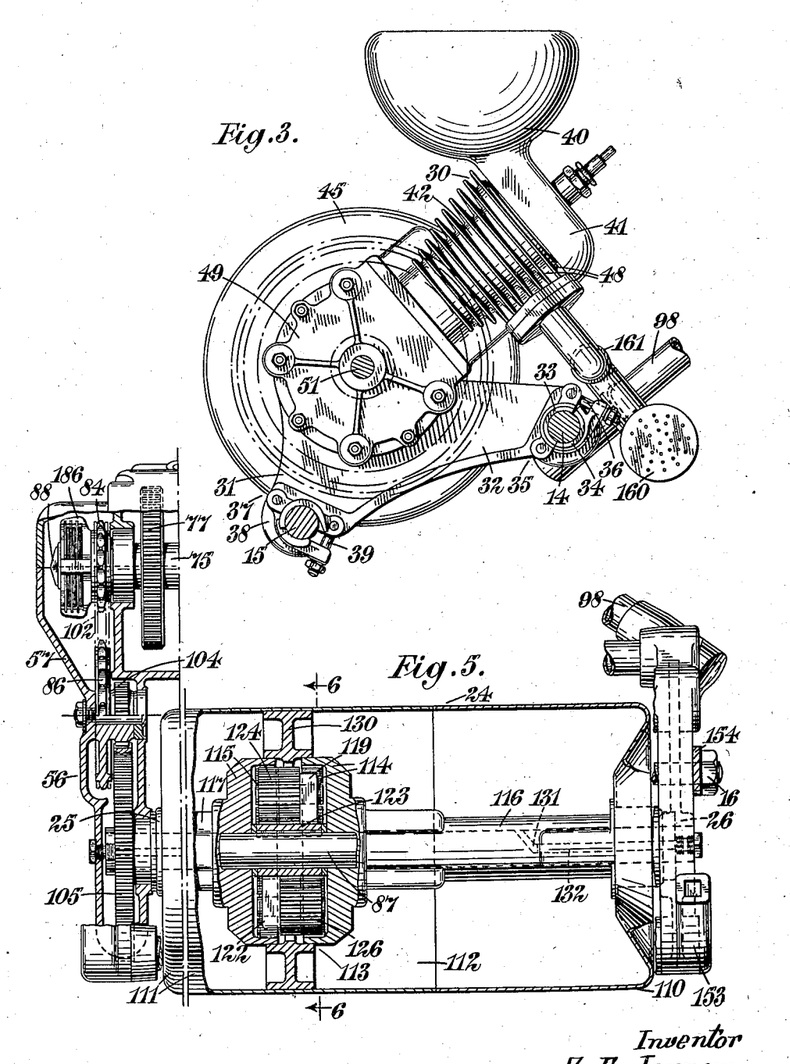
Figure 3 is a section taken on the line 3—3 in Figure 2ª showing the power-unit and its fastening clips in side elevation.
Figure 5 is an elevation with parts broken away and parts in vertical section on the line 5—5 in Figure 6 showing the driving roller, differential gear therein, and transmission mechanism for driving the roller.

The preferred construction of power-unit, as shown in Figures 1, 2 and 3, is a water-cooled internal-combustion engine 30 wherein a relatively small water-supply tank 40 shaped like a circular bowl is formed or provided directly on the water jacket 41 forming part of the head of the engine, and is open above to the atmosphere and is preferably situated in view of the operator of the mower when the machine is in use. The employment of a radiator is thus obviated; the water simply boils away and can be readily replenished when needed, because a lawn-mower when in use is always not far from a water supply, and the water tank can be readily seen by the operator, it being preferably always under his eye when in use. In this way a satisfactory engine is obtained without any material addition to the weight of the mower, and furthermore a readily detachable motor can be used without having to break complicated water joints or the like such as are likely to be beyond the capacity of the ordinary gardener to attend to.

The engine 30 cooled as aforesaid is disposed in a slanting position and the body of the water jacket 41 is, for the purpose described hereinafter, in the form of an annular chamber at the cylinder head and surrounds only a short length of the cylinder 42 at the end adjacent the head, and the supply tank 40 opens into the upper portion of the said annular chamber. The purpose of using an annular chamber is to leave the centre of the cylinder head, which may be a detachable aluminium head, free for the ignition plug which is thus readily accessible and yet will be efficiently cooled by the jacket which is kept of small dimensions and nevertheless ensures good circulation. The tank or water pot 40 is preferably of hemispherical shape and may be integral with the body 41 of the jacket.

An impeller 43, for example a radial flow impeller, is preferably arranged to be driven by the engine crank-shaft 44 for producing a blast of air and means are provided for directing the blast against that portion of the body of the cylinder 42 not surrounded by the water jacket 41. As illustrated, this impeller 43 is in the form of a fly-wheel mounted on the crank shaft, and the blast-directing means is in the form of a casing 45 surrounding the fly-wheel, which casing has an axial inlet at 46 and an outlet at 47 so arranged that a current of air is induced by the impeller to flow past the crank case for cooling the latter. When the engine cylinder is partly water cooled and partly air cooled as described above, the body of the cylinder below the water jacket is preferably provided with the usual cooling fins 48 on to which the blast is directed. The casing 45 surrounding the impeller is secured as by bolts in any convenient manner to the crank case 49.

Driving gear designated generally by the numeral 50 operatively connects the motor 30 with the rotary cutter 20 and the driving roller 24, and preferably comprises a main driving shaft 51 that lies parallel with the said stretcher rods 13, 14, 15 and is engaged directly by a coupling 52, 53 with the motor crank shaft 44 which is also parallel with the stretcher rods. This coupling 52, 53 may be a slip coupling of any convenient construction that enables the two shafts 44, 51 to be disengaged and engaged by a simple movement of the motor in a direction parallel with the stretcher rods or in a direction at right-angles thereto. As illustrated the slip coupling takes the form of a self-adjusting coupling of the Oldham type, whereof one element 53 is formed on the impeller 43 and the other element 52 is fast on the end of the shaft 51.

The driving gear 50 comprises power-transmission means designated generally by the numeral 55 (Figure 2) connecting the main shaft 51 with the rotary cutter 20, and separate power transmission means designated generally by the numeral 56 (Figures 2 and 5) connecting the main shaft 51 with the back roller 24. The side frame member 12 is formed as a casing for housing these transmission means 55, 56, and the upper part of the rear end of this casing 12 preferably constitutes a change-speed gear box 57 in which said main driving shaft 51 is journalled in ball bearings 58. At the side of these bearings remote from the motor this shaft 51 carries a cutter-driving sprocket wheel 59 which is free to rotate on the shaft and is geared by a chain 60 with a driven sprocket wheel 61 fast in said casing 12 on the shaft 21 of the rotary cutter 20. For clutching the driving sprocket wheel 59 to its shaft 51 a slip clutch of any convenient form may be provided. In the preferred construction illustrated (Figures 2 and 4) one clutch disc 62 slidable on the shaft 51 towards and away from a co-operating clutch disc 63 formed on the sprocket wheel 59 is controlled by a spring 64 tending to hold the discs in clutching engagement, and disengaging means designated generally by the numeral 65 may be provided for at times holding the spring-controlled clutch disc 64 out of engagement with the co-operating disc 63. These disengaging means 65 comprise a bolt 66 that is movable endwise in an axial bore 67 in the main driving shaft 51. A key 68 extends diametrically through the hub of the disc 62, passing through a longitudinal slot 69 in the shaft 51 and through a slot 169 in the bolt 66. The key 68 fits in the slot 169 but has play in the slot 69 in the direction of length of the shaft 51. A disengaging nut 70 is provided on the end of the bolt 66 which extends out of the shaft 51. This nut co-operates with the adjacent end of the shaft, and, when screwed up, will move the bolt 66 endwise in the bore 67 and thereby move the spring-controlled clutch disc into its disengaged position and hold it therein against the action of its spring 64 as shown in Figure 4. A light spring 71 at the other end of the bolt 66 tends to move it in the direction for disengaging the clutch.

These two clutch discs 62, 63 are preferably corrugated on their co-operating faces or otherwise so formed that when the clutch slips a noise, such as a warning buzz, is set up to notify the operator that the cutter 20 is not being driven by the motor.

The transmission mechanism 56 (Figure 5) for driving the back roller 24 comprises a hollow lay shaft 75 in the gear-box 57 that carries two gear wheels 76, 77 with which sliding gear wheels 78, 79 on the main driving shaft can be engaged by means of a change-speed lever 80 (Figure 1) mounted on the gear-box 57. This lever 80 controls a double sliding fork 81 which embraces the sliding gear wheels 78, 79 and is mounted to slide on a rod 82 carried in the gear-box parallel with the shafts 51, 75 therein.

A roller-driving sprocket wheel 84 is free to rotate on the lay shaft 75 in the same general plane as the cutter driving sprocket wheel 59, and is geared by a chain with a sprocket wheel 86 geared as described hereinafter with the axle 87 of the back roller 24. The lay shaft 75 is journalled by ball-bearings in the gear-box 57, and the sprocket wheel 84 can be held in driving engagement with the lay shaft 75 by a clutch of any convenient construction. A preferred construction of this clutch comprises a series of driving discs 85 slidably keyed on the end of the lay shaft remote from the motor, a driven disc 186 that has a series of discs keyed freely to it and carries the sprocket wheel 84, a bolt 87 that extends through the lay shaft 75 and has at one end a head 88 bearing against the driving disc 85, a flanged collar 89 and lock nut 90 at the other end, and a compression spring 91 in a recess 92 in the adjacent end of the lay shaft 75 abutting at one end against a shoulder therein and at the other end against the collar 89, which spring 91 tends to hold the clutch 85, 186 engaged. Any convenient control mechanism, for example a lever 94 fulcrumed on the gear-box 57 at 95 and acting on the end of the bolt 87, and a Bowden wire 96 controlled by a hand lever on the handles 98 of the mower may be provided for disengaging and engaging the clutch 85, 186 at will by the operator. Preferably, a thrust ball-bearing 99 is provided between the lever 94 and bolt 87, a hardened steel pin 100 being carried by the lever 94 for co-acting with the adjacent end of the bearing 99.

The transmission 56 to the back roller axle 87 comprises reduction gear in the form of a slower motion sprocket wheel 86 (Figure 5) that is geared by a chain 102 with said roller-driving sprocket wheel 84 and is fast on the axle of a pinion 104 meshing with a spur gear 105 on the axle 87 of the roller 24. This chain drive 56 and the change-speed gear 76, 77, 78, 79, as well as the chain drive 55 aforesaid of the rotary cutter 20, are all enclosed in said casing 12 which may be charged with oil to provide an oil bath for the transmission mechanism.

The back roller 24 (Figure 5) is divided into three parts, namely two end drums 110, 111 mounted as described hereinafter freely rotatable on the axle 87 journalled in said ball-bearings 25, 26, and a middle drum 112. A differential gear of any convenient construction is preferably provided in the middle drum 112. As illustrated, this differential gear designated generally by the numeral 113 (Figures 5, 6 and 7) comprises two annular sun-wheels 114, 115 formed or provided each on a sleeve 116, 117 respectively that are freely rotable one on each end of the axle 87 and carry respectively the end drums 110, 111. Keyed on the axle 87 between the sun-wheels 116, 117 is a planet-wheel carrier 118 shown separately in Figure 7. This carrier has four radial arms 119, 120, 121, 122 arranged in pairs at opposite sides of a central boss 123, the arms of each pair being not opposite one another, but staggered angularly one in relation to the other. Each of these arms 119, 120, 121, 122 carries respectively a planet-wheel 124, 125, 126, 127 which intermesh in pairs 124, 125 and 126, 127, whereof the wheels 125, 126 mesh with the annular sun-wheel 114, and the wheels 124, 127 mesh with the annular sun-wheel 115. A flanged ring 130 of H-section has driving connection with the planet-wheel carrier between the sun-wheels and is secured to the middle drum 112, the inner flanges of the ring 130 encircling the outer peripheries of the two sun-wheels. The axle 87 of the driving roller 24 is bored axially from each end towards the middle as shown at 131 to provide oil ducts, and two lubricating feed devices, shown as oiling tubes 132 are provided extending each through a side member of the frame into the bores, for supplying lubricant to the end drums. As illustrated, these tubes are screw-threaded at their outer ends in the side member of the frame and carry a nut outside the latter, a feed hole being provided in the screw-threaded portion of each tube.

Figure 8:
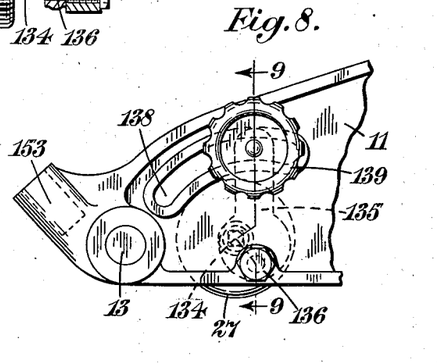
Figure 8 is a side elevation of the front end of the mower frame carrying the front roller and its adjusting device.
Figure 9:
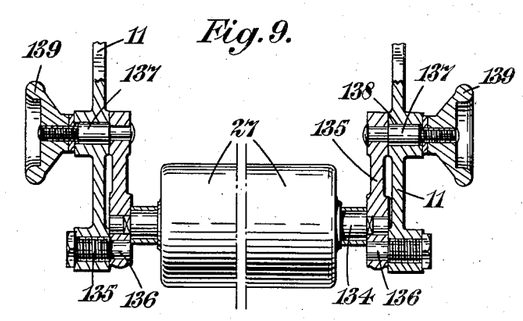
Figure 9 is a vertical sectional elevation taken on the line 9—9 in Figure 8.

As shown in Figures 8 and 9, the axle 134 of the front roller 27 is carried eccentrically and detachably by flatted or squared ends in two adjusting arms 135, journalled each at one end in one of the side members as shown at 136, and carrying each at the other end a pin 137 extending through an arcuate slot 138 in the adjacent side member, a clamping screw in the form of a thumb nut or hand wheel 139 being carried by each pin 137 outside the side members of the frame. This arrangement ensures that the arms 135 will move angularly in unison, so that the axle of the front roller will move parallel to itself and the front roller will be at the same height above the ground throughout its length.

A carrier of any convenient construction for carrying a ledger blade 140 may be mounted on the distance rod 16 aforesaid. A preferred construction of ledger-blade carrier is that disclosed in the said prior patent. It is desirable to facilitate starting the engine of a motor-driven lawn-mower by relieving the cutter cylinder of the mower from all contact with the ledger blade and thereby obviating the resistance due to such contact during the starting operation. Accordingly, setting means for the ledger blade are preferably provided comprising a manually-operable gear in the form of a worm gear 141 so operatively connected with the carrier 142 of the ledger blade as to shift the same when the gear 141 is rotated, in combination with a bushing 143 rotatable manually in the side member 11 of the frame 10, in which bushing the said gear 141 is so mounted as to be rotatable therewith and to be held against endwise movement in relation thereto, for the purpose of removing the ledger blade 140 out of contact with the rotary cutter 20 when starting the engine. In the preferred construction illustrated in Figure 10 the worm 141 is so mounted as to permit of axial movement whilst in engagement with a cooperating worm-wheel 146 arranged to rock the carrier 142 in known manner, and adjusting means are provided for shifting the worm 141 endwise and thereby rocking said blade carrier 142. The bushing 143 constitutes a bearing for the worm spindle that is held against endwise movement therein and is preferably held therein by friction against unintentional rotation. The worm is thus journalled not directly in the frame 10, but in the bushing 143 which is screwed by a quick thread in the side member 11 of the frame, and has a handle 144 movable angularly through about 180°, its movement being limited by a stop 145 that abuts against the frame in its end positions. When the engine is to be started the handle 144 is moved in such a direction that the worm 141 is moved endwise and cooperates like a toothed rack with its companion worm wheel 146 in the direction required to remove the ledger blade from contact with the rotary cutter. When the handle 144 is moved up to its limit in the other direction after the engine is running the worm 141 returns the ledger blade to the position in which it co-operates with the rotary cutter for the cutting operation. By turning a knob 147 on the worm spindle the ledger blade can be adjusted in the known manner in relation to the rotary cutter. This mechanism thus permits the ledger blade to be properly set in relation to the rotary cutter for cutting purposes, which setting is maintained when the blade is returned from its inoperative position to its cutting position after starting the engine.

An engine exhaust silencer 160 extends across the machine and has an elbow 164 at its centre and a slip connection at 161 (Figures 2ª and 3) with the exhaust pipe of the engine which is arranged in the direction of withdrawal of the power-unit and parallel to the crank shaft. A petrol tank 162 mounted on the handles 98 is connected to the carburetor 165 so as to be readily disconnected therefrom. For starting the engine a handle may be applied to the free end of the shaft 51 having a notch 163 for engagement by it.

It will be appreciated that the invention provides a power-driven lawn-mower suitable to be put in the hands of an unskilled operator and able to withstand severe use. Various defects, such as high centre of gravity, considerable addition of weight on the mower and increase in cost of manufacture and maintenance, due to the use of a water-cooled motor having a radiator arranged as is usual in motor-car practice are avoided by the improved construction, in which various modifications may be made without departing from the scope of the invention as defined in the claims.

I claim:

1. A power-driven lawn-mower comprising the combination of a frame, a rotary cutter and a driving roller journalled therein, a power-unit carried by said frame, transmission means operatively connecting the power-unit with said cutter and said roller, which transmission means comprises an engine-driven driving shaft and a change-speed gear driven by the latter, which change-speed gear is of the step-by-step type having a plurality of pairs of gear wheels of different gear ratios, and a controlling device for the change-speed gear for selecting at will any of the said gear ratios and thereby varying the speed of said cutter and roller in relation one to the other and the speed of one of them in relation to that of the power-unit, for the purposes described.

2. A power-driven lawn-mower comprising the combination of a frame having a rigid side member constituting a casing whereof a part is in the form of a gear-box, a rotary cutter and a driving roller journalled in said frame, a power-unit carried by said frame, transmission means operatively connecting the power-unit with said cutter and said roller, which transmission means comprises an engine-driven driving shaft that extends into said gear box, a change-speed gear that is housed in said gear box and is driven by said driving shaft, and driving means that is housed in said casing and connects said change-speed gear with said roller, which change-speed gear is of the step-by-step type having a plurality of pairs of gear wheels of different gear ratios, and a control device for the change-speed gear for selecting at will any of said gear ratios.

3. A power-driven lawn-mower comprising in combination a frame including two rigid side members and cross members connecting the latter in spaced relation; part of one of which side members constitutes a gear box, a rotary cutter and a driving roller journalled in said side members, a power-unit mounted spaced away from said gear box on said cross members, transmission means operatively connecting the power-unit with said cutter and roller, which transmission means comprises a power-unit-driven driving shaft that extends into said gear box, a change-speed gear of the step-by-step type having a plurality of pairs of gear wheels of different gear ratios, which change-speed gear is housed in said gear box and is driven by said driving shaft, and driving means that connects said change-speed gear with said cutter and roller, and a self-adjustable coupling connecting said driving shaft with the shaft of the power-unit.

4. A power-driven lawn-mower comprising the combination of a frame, a rotary cutter and a driving roller journalled therein, a power-unit carried by said frame, transmission means operatively connecting the power-unit with said cutter and said roller, which transmission means comprises an engine-driven driving shaft and a change-speed gear driven by the latter, which change-speed gear is of the step-by-step type having a plurality of pairs of gear wheels of different gear ratios, and a controlling device for the change-speed gear for selecting at will any of the said gear ratios and thereby varying the speed of said cutter and roller in relation one to the other and the speed of one of them in relation to that of the power-unit, which transmission means includes between the said change-speed gear and the shaft of the rotary cutter a spring-controlled slip clutch adapted automatically to disconnect the power-unit from said cutter in the event of the latter meeting with excessive resistance, and disengaging means for holding the clutch disengaged at will.

5. A power-driven lawn-mower comprising the combination of a frame, a rotary cutter and a driving roller journalled therein, a power-unit carried by said frame, transmission means operatively connecting the power-unit with said cutter and said roller, which transmission means comprises an engine-driven driving shaft and a change-speed gear driven by the latter, which change speed gear is of the step-by-step type having a plurality of pairs of gear wheels of different gear ratios, and a controlling device for the change-speed gear for selecting at will any of the said gear ratios and thereby varying the speed of said cutter and roller in relation one to the other and the speed of one of them in relation to that of the power-unit, which transmission means includes between the said change-speed gear and the shaft of the rotary cutter a spring-controlled slip clutch comprising clutch discs adapted automatically to disconnect the power-unit from said cutter in the event of the latter meeting with excessive resistance, and disengaging means for holding the clutch disengaged at will, the operative faces of which clutch discs are adapted to give a warning sound when the clutch is slipping.

In testimony whereof I affix my signature.

ARTHUR ERNEST JERRAM.